United States Patent
Adams et al.

(10) Patent No.: US 10,308,156 B2
(45) Date of Patent: Jun. 4, 2019

(54) MOVABLE VEHICLE CARGO TRAY

(71) Applicants: Eric Buck Adams, Readyville, TN (US); Darrell Adams, Readyville, TN (US)

(72) Inventors: Eric Buck Adams, Readyville, TN (US); Darrell Adams, Readyville, TN (US)

( * ) Notice: Subject to any disclaimer, the term of this patent is extended or adjusted under 35 U.S.C. 154(b) by 30 days.

(21) Appl. No.: 15/641,973

(22) Filed: Jul. 5, 2017

(65) Prior Publication Data

US 2018/0043810 A1  Feb. 15, 2018

Related U.S. Application Data

(60) Provisional application No. 62/358,454, filed on Jul. 5, 2016.

(51) Int. Cl.
*B60P 1/00* (2006.01)

(52) U.S. Cl.
CPC .................... *B60P 1/003* (2013.01)

(58) Field of Classification Search
CPC .. B60P 3/40; B60P 1/003; B60P 3/423; B60P 3/34; B60P 3/14; B60P 1/431; B60P 1/433; B60P 1/435; B60P 1/6427; B60P 3/122; B60P 3/42; B60P 1/00
USPC .... 296/26.09, 26.08, 183.1, 37.6, 65.05, 61, 296/35.3, 3; 224/404, 281, 510, 403, 224/405, 418, 566, 564
See application file for complete search history.

(56) References Cited

U.S. PATENT DOCUMENTS

| | | | | |
|---|---|---|---|---|
| 5,273,390 A | * | 12/1993 | Crissman | B60P 1/006 296/39.2 |
| 7,445,263 B1 | * | 11/2008 | Bluhm | B60P 1/003 296/26.09 |
| 8,020,911 B2 | * | 9/2011 | McKelvey | B60P 1/003 296/26.09 |
| 8,844,996 B2 | * | 9/2014 | Garchar | B62D 33/0273 296/26.09 |
| 2005/0212317 A1 | * | 9/2005 | Kobylski | B60P 1/003 296/26.09 |
| 2006/0145498 A1 | * | 7/2006 | Bartos | B60P 1/003 296/26.09 |
| 2007/0210599 A1 | * | 9/2007 | Arnold | B60P 1/003 296/26.09 |
| 2011/0260486 A1 | * | 10/2011 | Thygesen | B62D 33/02 296/26.09 |

(Continued)

*Primary Examiner* — D Glenn Dayoan
*Assistant Examiner* — Sunsurraye Westbrook
(74) *Attorney, Agent, or Firm* — Pitchford Fugett, PLC; Mark A. Pitchford; Eric B. Fugett

(57) ABSTRACT

A vehicle cargo management system includes a screw drive and lock system that allows the user to extend or retract a loaded tray with ease on un-level ground without the use of a power source (i.e., hydraulic or electrical assistance). The lock prawl system allows for locking positions at very short intervals which are helpful when a vehicle is backed up close to objects or buildings. The screw drive lock prawl system is actuated by a locking handle. Therefore, if the locking handle is locked in place, the tray cannot be extended from the bed, and the tray itself or any toolboxes or items bolted to the tray cannot be stolen from the vehicle (i.e., the bolts holding the frame of the cargo system to the vehicle cannot be accessed for removal).

12 Claims, 7 Drawing Sheets

(56) References Cited

U.S. PATENT DOCUMENTS

| | | | |
|---|---|---|---|
| 2013/0341949 A1* | 12/2013 | Bernthisel | B62D 33/0273 296/26.09 |
| 2014/0169921 A1* | 6/2014 | Carey | B62B 5/0003 414/495 |
| 2016/0121938 A1* | 5/2016 | Richins | B62D 33/0207 296/26.09 |

* cited by examiner

MOVABLE VEHICLE CARGO TRAY

CROSS-REFERENCES TO RELATED APPLICATIONS

This application claims priority to and hereby incorporates by reference in its entirety U.S. Provisional Patent Application No. 62/358,454 entitled "MOVABLE VEHICLE CARGO TRAY" filed on Jul. 5, 2016.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to systems for loading and unloading materials from a cargo area of a vehicle. More particularly, this invention pertains to systems for sliding loads into and/or out of cargo areas of vehicles.

Pickup truck beds are difficult to get items, particularly large items, into and out of. Items that do not remain close to the rear of pickup truck bed (i.e., near the tailgate), or items that are heavy and have to be lifted over the sides of the bed are particularly difficult to load and unload. Utility style beds with high sides used as storage cabinets are particularly difficult to load and unload.

Cargo loading and unloading trays are fitted to a vehicle's cargo area to provide a new floor for the vehicle's cargo area above the stock floor. Cargo is placed on the tray, the tray is slid into the cargo area, the vehicle transports the cargo to a new location, and the tray is slid out of the cargo area to allow easy access to the transported cargo. Cargo trays are basically not useable unless the vehicle is on level ground. If there is cargo in the tray, the weight makes it difficult or impossible to release the latch mechanism. If and when the latch mechanism is released, the cargo will slide in the direction gravity pulls it. If the truck (or van) is facing downhill, the tray cannot be pulled out of the bed manually. If the truck is facing uphill and a user manages to release the latch, the cargo and tray will slide freely out of the bed, typically knocking the user to the ground, and sometimes dumping the cargo on the tray off the back of the tray (potentially onto the user). Some manufactures have integrated electric motors and gear boxes or hydraulic rams to extend and retract the tray, but they are costly and when they malfunction, the tray is stuck in its current position which is typically in the closed or retracted position, making servicing the system very difficult (because the motors and/or hydraulics are covered by the tray). This makes the cargo area unusable, and if the tray is tuck in the extended position, the vehicle may not be safe to drive due to its additional length and the distribution of weight. A cargo tray typically has a number of locking positions between fully extended and fully retracted. These intermediary locking positions are typically spaced several inches apart such that the tray has a finite number of positions when in use. Cargo trays can also be stolen by extending the tray and removing bolts securing the tray to the cargo area.

BRIEF SUMMARY OF THE INVENTION

Aspects of the present invention provide a cargo system including a screw drive and lock system that allows the user to extend or retract a loaded tray with ease on un-level ground without the use of a power source. The lock prawl system allows for locking positions at very short intervals which are helpful when a vehicle is backed up close to objects or buildings. The screw drive lock prawl system is actuated by a locking handle. Therefore, if the locking handle is locked in place, the tray cannot be extended from the bed, and the tray itself or any toolboxes or items bolted to the tray cannot be stolen from the vehicle.

In one aspect, a movable vehicle cargo tray system includes a frame, a tray, a screw drive, and a thread engagement device. The frame is configured to secure to a cargo area of a vehicle. The tray is attached to the frame in a sliding engagement such as via a series of roller bearings or ball bearings. The screw drive is attached to the tray at opposing ends of the screw drive such that the screw drive is free to rotate about a longitudinal axis of the screw drive. The thread engagement device is affixed to the frame and configured to contact at least one thread of the screw drive such that the tray and screw drive are moved longitudinally relative to the frame and the longitudinal axis of the screw drive as the screw drive is rotated about the longitudinal axis of the screw drive.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The terms "above", "below", "over", and "under" mean "having an elevation or vertical height greater or lesser than" and are not intended to imply that one object or component is directly over or under another object or component.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Figure 1:
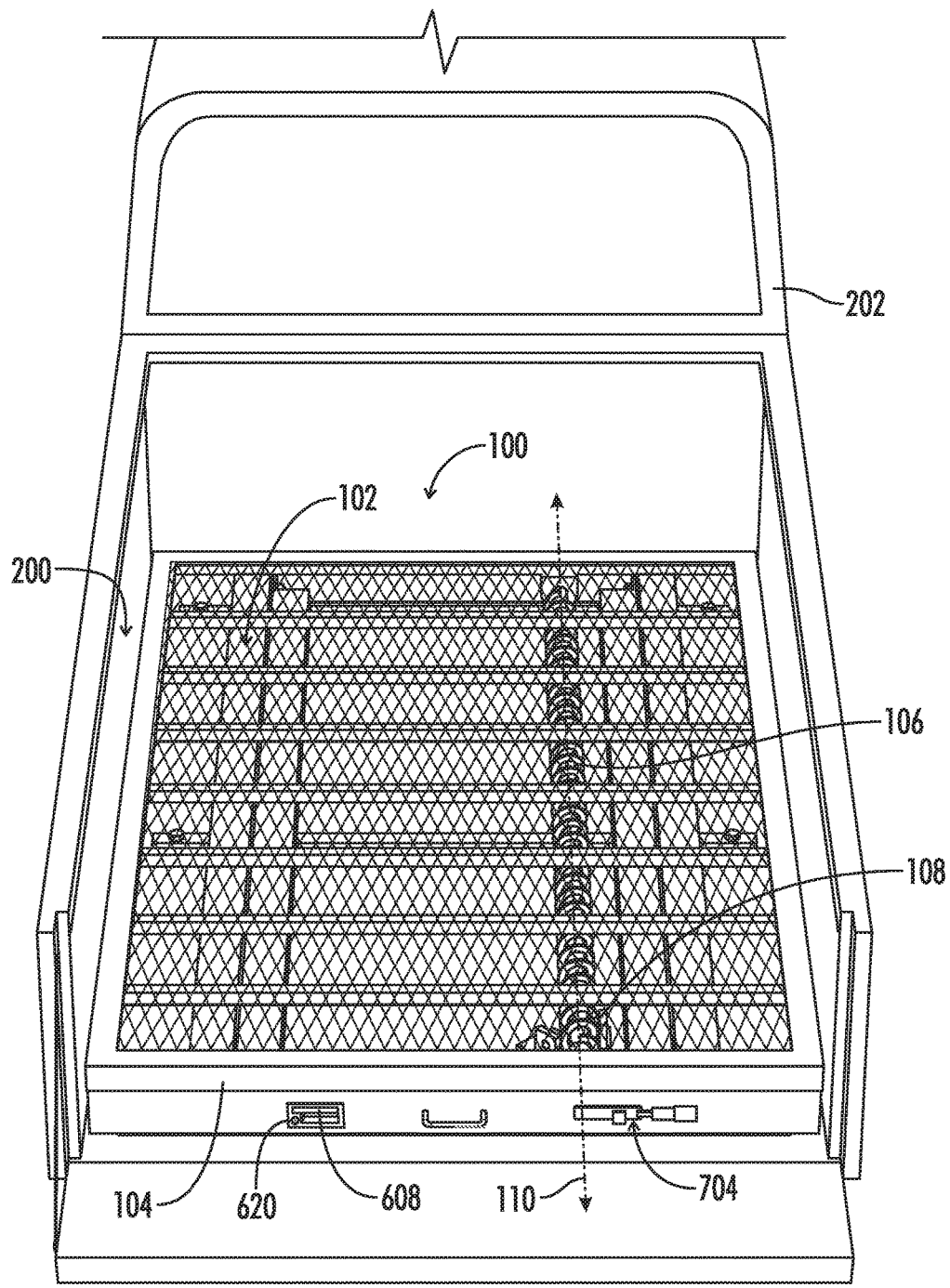
FIG. 1 is a rear elevated perspective view of a movable cargo tray in a fully retracted position.
Figure 2:
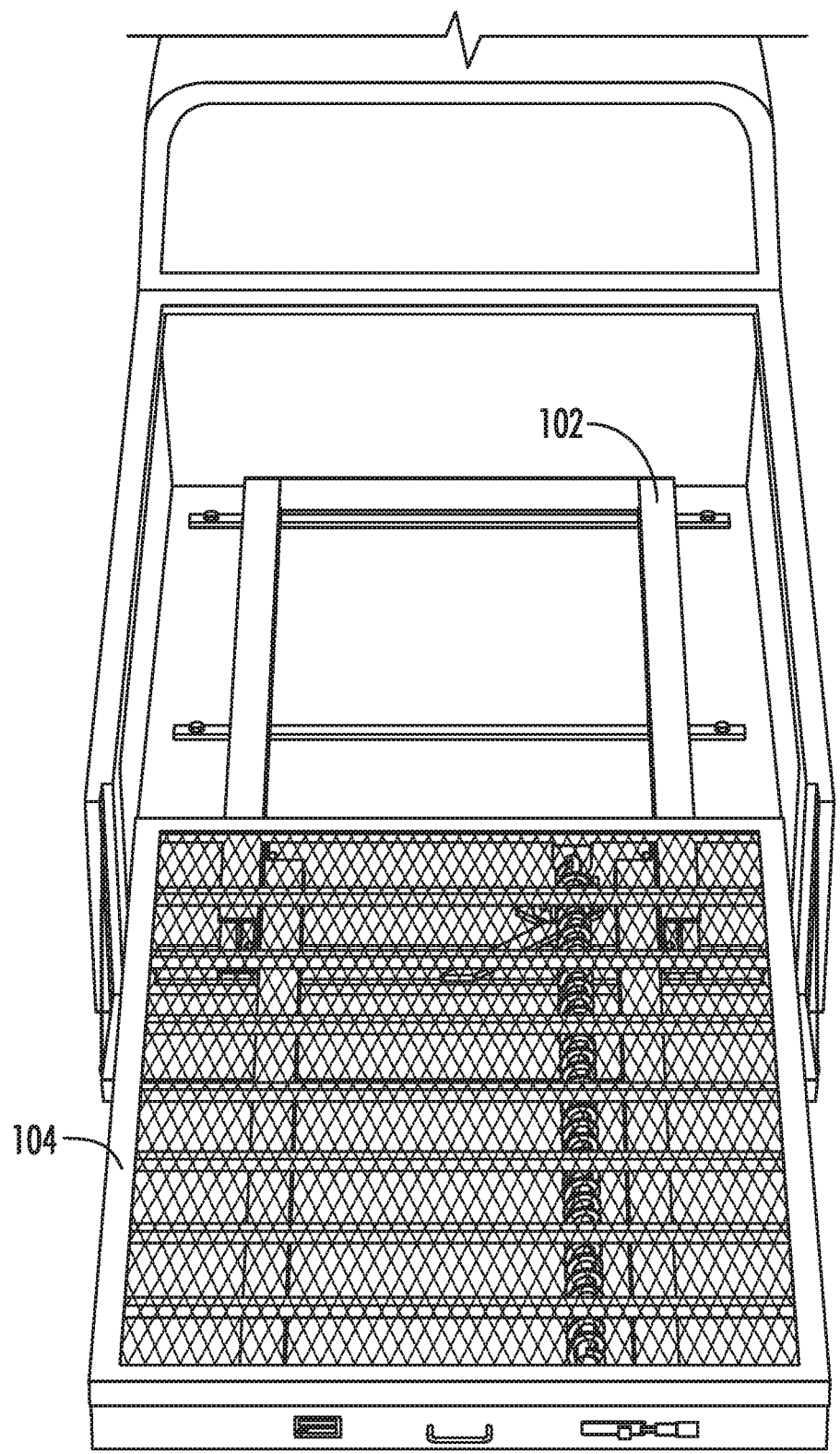
FIG. 2 is a rear elevated perspective view of a movable cargo tray in a fully extended position.
Figure 3:
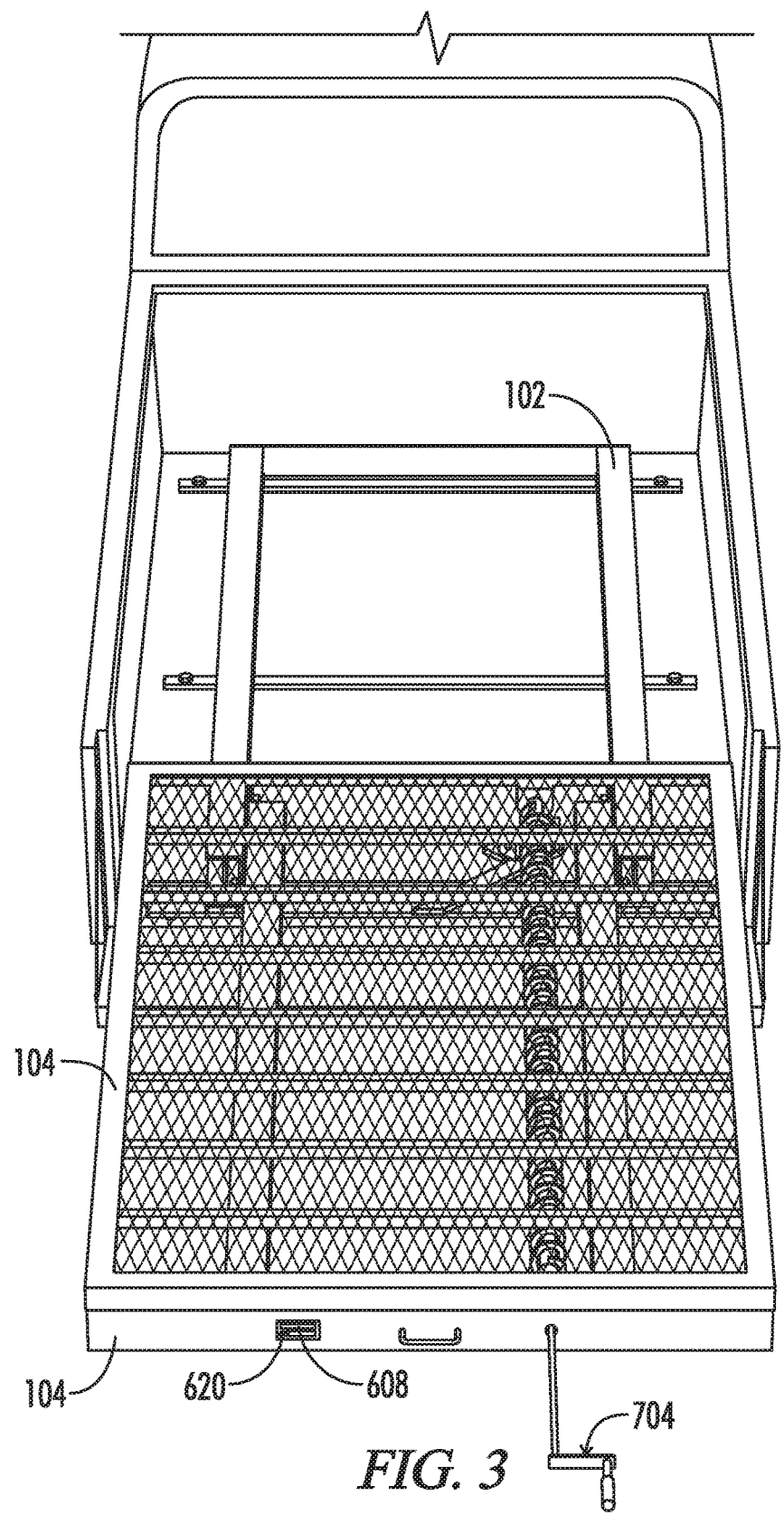
FIG. 3 is a rear elevated perspective view of a locking handle, crank handle, and lock of a movable cargo tray.
Figure 4:
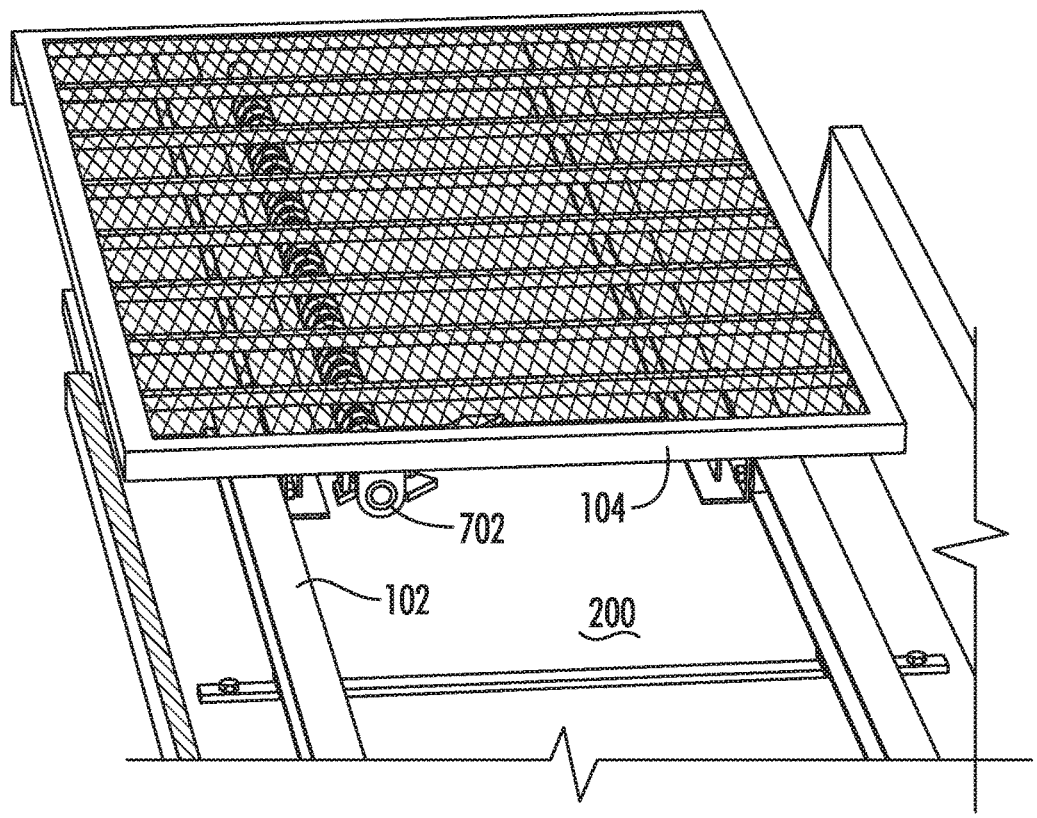
FIG. 4 is a front elevated perspective view of a movable cargo tray in a fully extended position.
Figure 5:
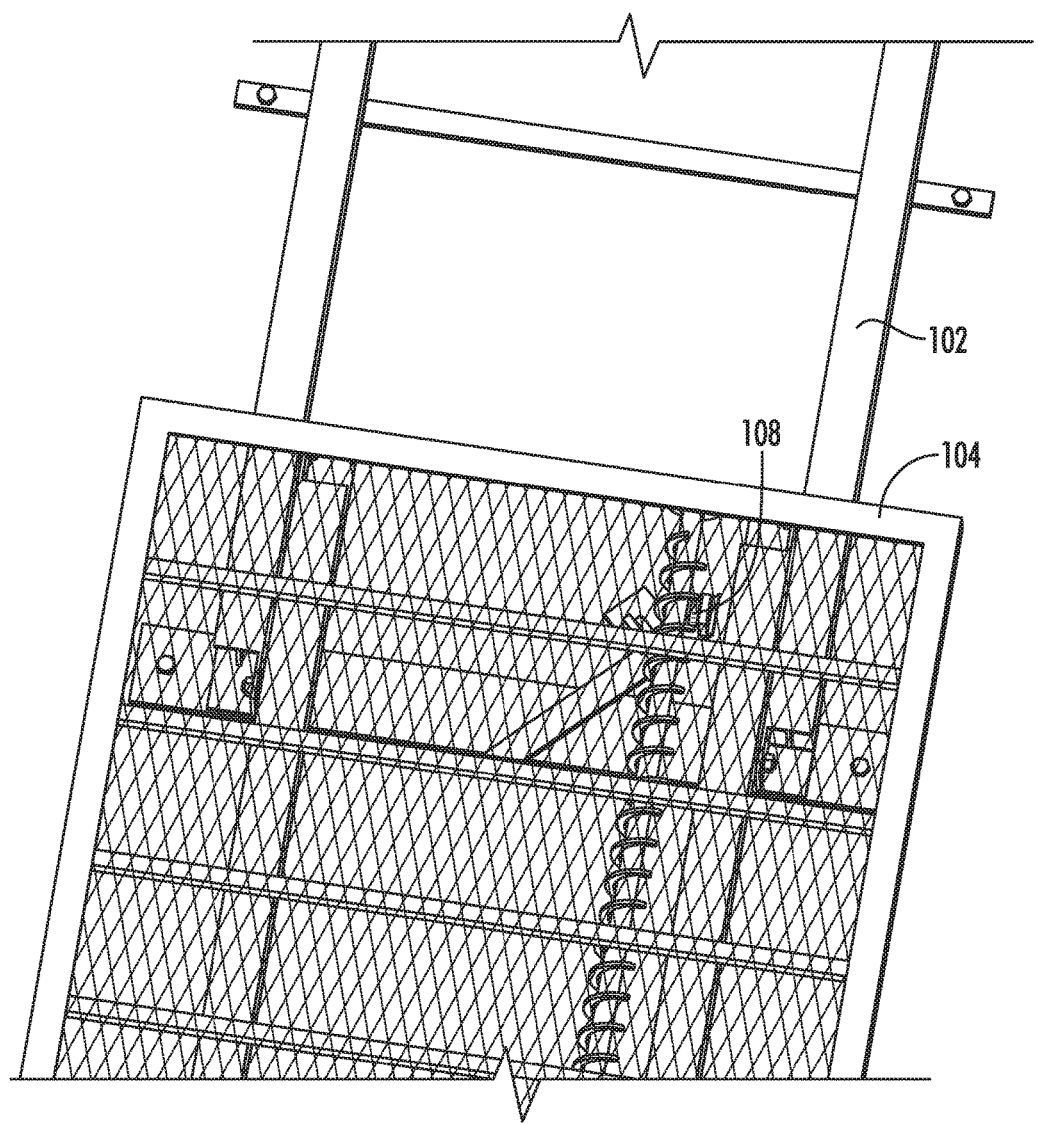
FIG. 5 is a top perspective view of a movable cargo tray in a fully extended position.
Figure 6:
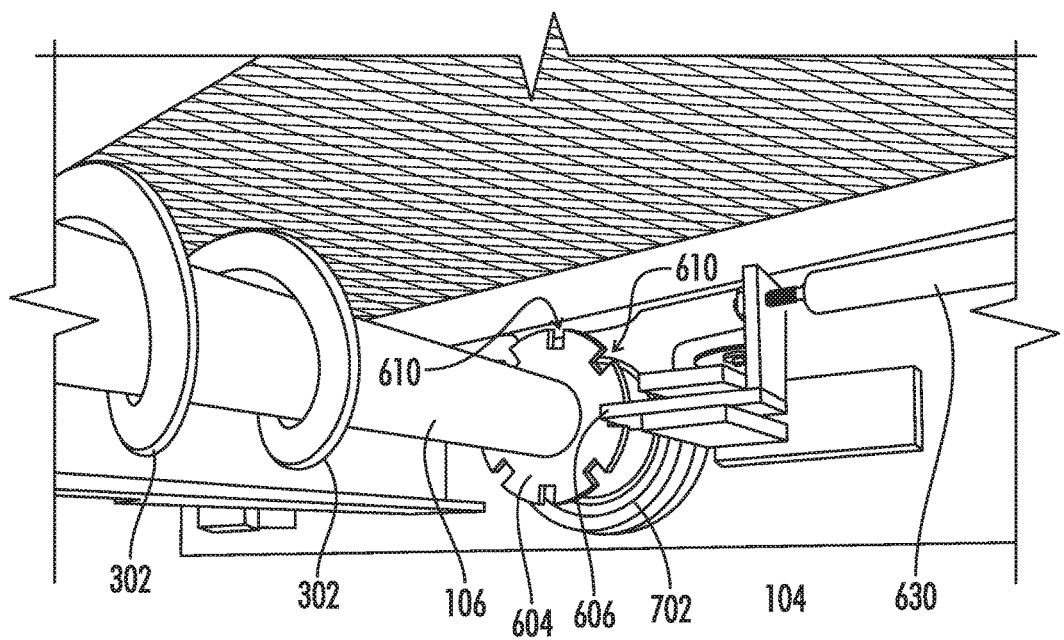
FIG. 6 is a bottom perspective view of a screw drive of a movable cargo tray.
Figure 7:
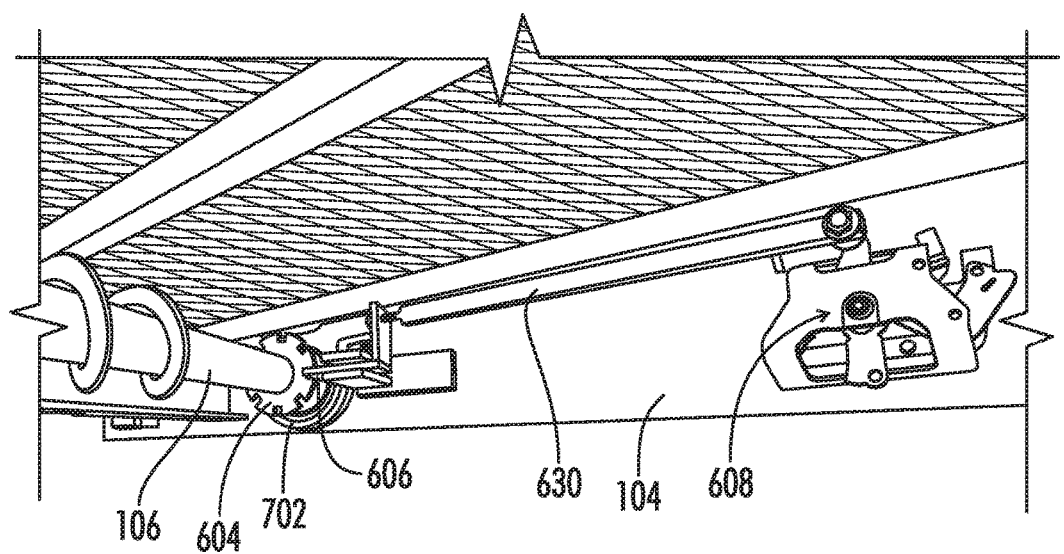
FIG. 7 is a bottom perspective view of a locking ring and lock prawl of a movable cargo tray.

Referring to FIGS. 1-7, in one embodiment, a movable vehicle cargo tray system 100 includes a frame 102, the tray 104, the screw drive 106, and a thread engagement device 108. The frame 102 is configured to secure to a cargo area 200 of a vehicle 202. In one embodiment, the frame 102 is bolted to a floor of the cargo area 200 of the vehicle 202. The tray 104 is attached to a sliding engagement to the frame 102. In one embodiment, the tray 104 is attached to the frame 102 by at least two drawer ball bearing slides. In another embodiment, the tray 104 contacts the frame 102 via at least 4 roller bearings.

The screw drive 106 is attached to the tray 104 at opposing ends of the screw drive 106. The screw drive 106 is free to rotate about the longitudinal axis 110 of the screw drive 106. In one embodiment, opposing ends of the screw drive 106 are attached to the tray 104 via bearings 702 such that the screw drive 106 is able to freely rotate about the longitudinal axis 110 of the screw drive 106 when not in a locked position. In one embodiment, the screw drive 106 is an auger having threads at least 1 inch in depth and on at least a 1 inch pitch. This enables a user to quickly extend or retract the tray 104 by manually rotating the screw drive 106 while also providing enough mechanical advantage to make manually rotating the screw drive 106 safe and easy.

The thread engagement device 108 is affixed to the frame 102 and configured to contact at least one thread 302 of the screw drive 106 such that the tray 104 and screw drive 106 are moved longitudinally relative to the frame 102 and the longitudinal axis 110 of the screw drive 106 is the screw drive 106 is rotated about the longitudinal axis 110 of the screw drive 106. In one embodiment, the thread engagement device 108 is a bearing configured to rotate about an axis perpendicular to the longitudinal axis 110 of the screw drive 106. In one embodiment, an outer surface 502 of the bearing 108 is positioned and sized to simultaneously engage two adjacent threads 302 of the screw drive 106.

In one embodiment, the movable vehicle cargo tray system 100 further includes a crank handle 704 extending from an end of the screw drive 106. The crank handle 704 is configured to engage the screw drive 106 such that the user can rotate the crank handle 704 about the longitudinal axis 110 of the screw drive 106 and rotate the screw drive 106 about the longitudinal axis 110 of the screw drive 106. Depending on the direction of rotation, the interaction between the threads 302 of the screw drive 106 and the thread engagement device 108 cause the tray 104 to move forward or rearward with respect to the frame 102 and vehicle 202.

In one embodiment, the movable vehicle cargo tray system 100 further includes a locking ring 604 a lock prawl 606 and a lock handle 608. The locking ring 604 is attached to the screw drive 106 at a rear end of the screw drive 106. The locking ring 604 has a plurality of notches 610 extending radially inward from an outer surface of the locking ring 604. In one embodiment, the notches 610 are spaced less than 1 inch from one another (about the circumference of the locking ring) such that the tray 104 has at least 20 latch or locking positions within the available travel distance of the tray 104. The lock prawl 606 is configured to engage a notch 610 of the plurality of notches 610 in the locking ring 604 such that the screw drive 106 is prevented from rotating about the longitudinal axis 110 of the screw drive 106 when the lock is engaging the notch 610 of the plurality of notches 610 in the locking ring 604. The lock handle 608 is configured to actuate the lock between a first position engaging the notch 610 in the locking ring 604 and a second position preventing engagement of the lock prawl 606 with any of the notches 610 of the plurality of notches 610 in the locking ring 604. The lock prawl 606 is configured to engage any notch 610 of the plurality of notches 610 in the locking ring 604. The lock handle 608 is biased (e.g., by a spring) to hold the lock prawl 606 and the first position. In order to move the tray 104 relative to the frame 102, the lock handle 608 must be held such that the lock prawl 606 is actuated to the second position while rotating the crank handle 704 of the movable vehicle cargo tray system 100. In one embodiment, the lock handle 608 is connected to the lock prawl 606 via a connecting rod 630. In one embodiment, the movable vehicle cargo tray system 100 further includes a lock 620 configured to prevent movement of the lock handle 608 such that the lock handle 608 cannot actuate the lock prawl 606 into the second position.

In one embodiment, the crank handle 704 is able to slide into and out of the screw drive 106. That is, the crank handle 704 may be extended longitudinally from the screw drive 106. The tray 104 includes a tab 706 to retain the crank handle 704 against a rear wall of the tray 104 when the crank handle 704 is not in use. In one embodiment, the crank handle 704 and tab 706 operate as a secondary locking mechanism for the screw drive 106 by preventing rotation of the screw drive 106 in a first direction (e.g., the direction corresponding to rearward movement of the tray 104) when the crank handle 704 is retained by the tab 706.

In one embodiment, a movable vehicle cargo tray system 100 includes a frame 102, a tray 104, main bearings (i.e., roller bearings or bearing slides attaching the tray 104 to the tray 102), an auger (i.e., screw drive 106), auger bearings 704 (i.e., screw drive bearings), a locking ring 604, a lock prawl 606, a release handle 608, a pull handle, and a crank handle 704. The frame 102 mounts to a cargo area 200 (e.g., a truck bed). The frame 102 has two main bearings at the rear (e.g., near the truck's tailgate) that ride in the frame rail of the top tray 104. The tray 104 mounts into the bed frame 102 and has two main bearings that are mounted at the cab end (i.e., front end) that ride in a frame rail of the bed frame 102. These main bearings support weight in the tray 104 and make the tray 104 easily movable relative to the frame 102 when.

Thrust bearings are mounted to the frame 102 at the rear of the frame 102 (i.e., tailgate end of the frame) and at the front end (i.e., cab end) of the tray 104 to keep the tray 104 from binding to the frame 102 from side loads.

The auger 106 is supported by auger bearings 704 affixed to the tray 104 at a front end and a rear end of the tray 104. The auger 106 runs parallel to the frame rails of the tray 104 and frame 102. A thread engagement device 108 (e.g., a bearing) is fixed to the frame 102 and configured to engage the threads 302 of the auger 106. In one embodiment, the thread engagement device 108 is a bearing fitted around a shaft of the auger 106 and attached to the frame 102. Thus, spinning the auger or screw drive 106 causes the tray 104 to move relative to the frame 102, and the tray 104 cannot move relative to the frame 102 without the auger 106 spinning in or direction or the other about its longitudinal axis 110.

The locking ring 604 is fixedly mounted to the auger 106 shaft near the rear of the shaft and is allowed to rotate only when the lock prawl 606 is pulled away from the locking ring 604 against spring pressure to remove the lock prawl 606 from one of a plurality of notches 610 in the locking ring 604. The locking ring 604 has a larger diameter on one side of each notch which forms a tall notch wall in either direction of rotation. Thus, if the auger 106 is spinning at high rpms, the lock prawl 606 cannot skip or jump any notches 610 or seats when the lock handle 608 is released, biasing the lock prawl 606 back into contact with the locking ring 604. The lock prawl 606 will hit the higher wall which will stop rotation and engage the lock prawl 606 deeper into the notch 610 or seat. The lock prawl 606 is actuated by the lock handle 608. In one embodiment, the screw drive 106 is an auger with a relatively low thread pitch such that the tray 104 can be manually extended or retracted when the lock handle 608 is holding the lock prawl 606 in a second position (i.e., the lock prawl 606 is disengaged from the locking ring 604).

The pull handle is for pulling the tray out or pushing the tray in if the crank handle is not needed (i.e., if the tray 104 is not loaded or is lightly loaded). The crank handle 704 is used to turn the auger 106 while the lock handle 608 is being pulled so that the tray 104 will extend or retract as the auger 106 (i.e., screw drive) rotates.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful MOVABLE VEHICLE CARGO TRAY it is not intended that such references be construed as limitations upon the scope of this invention except as set forth in the following claims.

What is claimed is:

1. A movable vehicle cargo tray system comprising:
 a frame configured to secure to a cargo area of a vehicle;
 a tray attached in a sliding engagement to the frame;
 a screw drive attached to the tray at opposing ends of the screw drive, wherein the screw drive is free to rotate about a longitudinal axis of the screw drive;
 a thread engagement device affixed to the frame and configured to contact at least one thread of the screw drive such that the tray and screw drive are moved longitudinally relative to the frame and the longitudinal axis of the screw drive as the screw drive is rotated about the longitudinal axis of the screw drive; and
 a crank handle extending from an end of the screw drive, said crank handle configured to engage the screw drive such that a user can rotate the crank handle about the longitudinal axis of the screw drive and rotate the screw drive about the longitudinal axis of the screw drive.

2. The movable vehicle cargo tray system of claim 1, wherein the thread engagement device is a bearing configured to rotate about an axis perpendicular to the longitudinal axis of the screw drive.

3. The movable vehicle cargo tray system of claim 1, wherein the thread engagement device is a bearing configured to rotate about an axis perpendicular to the longitudinal axis of the screw drive, and an outer surface of the bearing is positioned and sized to simultaneously engage two adjacent threads of the screw drive.

4. The movable vehicle cargo tray system of claim 1, wherein the opposing ends of the screw drive are attached to the tray via bearings such that the screw drive is able to freely rotate about the longitudinal axis of the screw drive when not in a locked position.

5. The movable vehicle cargo tray system of claim 1, wherein the screw drive is an auger having threads at least 1" in depth and on at least a 1" pitch.

6. The movable vehicle cargo tray system of claim 1, further comprising:
- a locking ring attached to the screw drive at a rear end of the screw drive, wherein the locking ring has a plurality of notches extending radially inward from a an outer surface of the locking ring;
- a lock prawl configured to engage a notch of the plurality of notches in the locking ring such that the screw drive is prevented from rotating about the longitudinal axis of the screw drive when the lock prawl is engaging the notch of the plurality of notches in the locking ring; and
- a lock handle configured to actuate the lock prawl between a first position engaging the notch in the locking ring and a second position preventing engagement of the lock prawl with any of the notches of the plurality of notches in the locking ring.

7. The movable vehicle cargo tray system of claim 6, wherein the lock prawl is configured to engage any notch of the plurality of notches in the locking ring.

8. The movable vehicle cargo tray system of claim 6, further comprising a lock configured to prevent movement of the lock handle such that the lock handle cannot actuate the lock prawl into the second position.

9. The movable vehicle cargo tray system of claim 6, wherein the lock handle is biased to hold the lock prawl in the first position and in order to move the tray longitudinally relative to the frame, the lock handle must be held such that the lock prawl is actuated to the second position while rotating a crank handle of the movable vehicle cargo.

10. The movable vehicle cargo tray system of claim 1, wherein the tray is attached to the frame by at least two drawer ball bearing slides.

11. The movable vehicle cargo tray system of claim 1, wherein the tray is contacts the frame via at least 4 roller bearings.

12. A movable vehicle cargo tray system comprising:
- a frame configured to secure to a cargo area of a vehicle;
- a tray attached in a sliding engagement to the frame;
- a screw drive attached to the tray at opposing ends of the screw drive, wherein the screw drive is free to rotate about a longitudinal axis of the screw drive;
- a thread engagement device affixed to the frame and configured to contact at least one thread of the screw drive such that the tray and screw drive are moved longitudinally relative to the frame and the longitudinal axis of the screw drive as the screw drive is rotated about the longitudinal axis of the screw drive;
- a locking ring attached to the screw drive at a rear end of the screw drive, wherein the locking ring has a plurality of notches extending radially inward from a an outer surface of the locking ring;
- a lock prawl configured to engage a notch of the plurality of notches in the locking ring such that the screw drive is prevented from rotating about the longitudinal axis of the screw drive when the lock prawl is engaging the notch of the plurality of notches in the locking ring; and
a lock handle configured to actuate the lock prawl between a first position engaging the notch in the locking ring and a second position preventing engagement of the lock prawl with any of the notches of the plurality of notches in the locking ring.

* * * * *